(12) United States Patent
Ocheduszko (10) Patent No.: US 12,025,105 B2
(45) Date of Patent: Jul. 2, 2024

(54) WIND TURBINE NACELLES

(71) Applicant: General Electric Renovables Espana, S.L., Barcelona (ES)

(72) Inventor: Przemyslaw Jan Ocheduszko, Barcelona (ES)

(73) Assignee: General Electric Renovables Espana, S.L., Barcelona (ES)

( * ) Notice: Subject to any disclaimer, the term of this patent is extended or adjusted under 35 U.S.C. 154(b) by 0 days.

(21) Appl. No.: 17/902,155

(22) Filed: Sep. 2, 2022

(65) Prior Publication Data

US 2023/0072624 A1    Mar. 9, 2023

(30) Foreign Application Priority Data

Sep. 6, 2021 (EP) .................................... 21382800

(51) Int. Cl.
 *F03D 80/50*  (2016.01)
 *F03D 80/80*  (2016.01)

(52) U.S. Cl.
 CPC .................. *F03D 80/80* (2016.05)

(58) Field of Classification Search
 None
 See application file for complete search history.

(56) References Cited

U.S. PATENT DOCUMENTS

| 4,527,072 A | 7/1985 | van Degeer |
| 4,757,211 A | 7/1988 | Kristensen |
| 7,845,693 B2 | 12/2010 | Li et al. |
| 8,070,101 B2 | 12/2011 | Vauchel et al. |
| 8,371,820 B2 * | 2/2013 | deBuhr .................. F03D 80/00 416/244 R |
| 8,721,258 B2 | 5/2014 | Eriksen et al. |
| 8,793,973 B2 | 8/2014 | Vauchel |
| 8,975,770 B2 | 3/2015 | Gelmini |
| 9,228,567 B2 | 1/2016 | Bitsch et al. |
| 9,334,852 B2 | 5/2016 | Olsen |
| 9,670,898 B2 * | 6/2017 | Abolfazlian ............ F03D 80/80 |

(Continued)

FOREIGN PATENT DOCUMENTS

| CA | 2659334 C | 1/2015 |
| CA | 3012945 C | 5/2019 |

(Continued)

OTHER PUBLICATIONS

European Search Report Corresponding to EP21382800.7 dated Feb. 22, 2022.

(Continued)

*Primary Examiner* — Kayla McCaffrey
(74) *Attorney, Agent, or Firm* — Dority & Manning, P.A.

(57) ABSTRACT

The present disclosure relates to wind turbine nacelles (16), comprising a housing including a front side (270), and a rear side (250) separated from the front side along an axial direction (x), first and second sidewalls (260) extending from the front side to the rear side and a roof. The roof comprises one or more roof panels (210, 220, 230, 240), and at least one of the roof panels is a displaceable roof panel configured to be displaced relative along the axial direction (x) to another part of the roof to provide access to the nacelle (16) from above. The present disclosure further relates to methods for providing access to an inside of the nacelle.

16 Claims, 8 Drawing Sheets

(56) References Cited

U.S. PATENT DOCUMENTS

| | | | |
|---|---|---|---|
| 9,677,543 | B2 | 6/2017 | Kamibayashi et al. |
| 9,683,555 | B2 * | 6/2017 | Arndt .................. F03D 13/20 |
| 9,783,315 | B2 | 10/2017 | James |
| 9,845,791 | B2 * | 12/2017 | Fenger .................. F03D 13/10 |
| 9,909,559 | B2 | 3/2018 | Lohan et al. |
| 10,982,659 | B2 * | 4/2021 | Madsen ............... B66C 23/207 |
| 11,168,671 | B2 | 11/2021 | Aitken |
| 11,221,000 | B2 * | 1/2022 | Aitken .................. F03D 80/80 |
| 2010/0011575 | A1 | 1/2010 | Numarjiri |
| 2010/0232977 | A1 | 9/2010 | Mogensen et al. |
| 2011/0076140 | A1 | 3/2011 | Elsenheimer et al. |
| 2012/0125876 | A1 | 5/2012 | Park et al. |
| 2013/0259677 | A1 | 10/2013 | Kamibayashi et al. |
| 2014/0334908 | A1 | 11/2014 | Hansen et al. |
| 2017/0022966 | A1 * | 1/2017 | Therkildsen ............ F03D 80/88 |
| 2019/0219035 | A1 | 7/2019 | Garcia De La Pena |
| 2020/0002908 | A1 | 1/2020 | Avner et al. |

FOREIGN PATENT DOCUMENTS

| | | |
|---|---|---|
| CN | 102449294 A | 5/2012 |
| CN | 107725284 A | 2/2018 |
| CN | 110805516 A | 2/2018 |
| EP | 1677007 A2 | 7/2006 |
| EP | 2175126 A2 | 4/2010 |
| EP | 2304231 B1 | 3/2013 |
| EP | 3242014 A1 | 11/2017 |
| EP | 3372730 A1 | 9/2018 |
| EP | 3611372 A1 | 2/2020 |
| EP | 4047205 A1 | 8/2022 |
| MX | 2019003267 A | 7/2019 |
| NZ | 592442 A | 9/2012 |
| RU | 2458246 C1 | 8/2012 |
| WO | WO2010031528 A2 | 3/2010 |
| WO | WO2012105971 A1 | 8/2012 |
| WO | WO2016023880 A2 | 2/2016 |
| WO | WO2020/082167 A1 | 4/2020 |
| WO | WO2022/090061 A1 | 5/2022 |

OTHER PUBLICATIONS

Sliding Systems, Professional Range—Extreme Duty Carbon Steel C45, 5 pages. Retrieved Aug. 4, 2022 from webpage: https://gsfslides.com/professional_range_steel_extreme_duty/.

European Office Action EP21382800 on Mar. 13, 2024.

* cited by examiner

WIND TURBINE NACELLES

The present disclosure relates to wind turbines, and more particularly relates to wind turbine nacelles. The present disclosure further relates to methods and systems to provide access to the nacelle from above.

BACKGROUND

Modern wind turbines are used for supplying electricity to the grid. A wind turbine generally includes a tower with a nacelle supported on top of the tower. A wind turbine rotor comprising a hub and a plurality of wind turbine blades may be rotatably mounted to the nacelle.

The wind turbine blades may be set in motion by wind. The hub of the wind turbine may be operatively coupled with a rotor of a generator. As the hub and blades rotate, the kinetic energy of the wind is converted to kinetic mechanical energy of the wind turbine rotor and ultimately to electrical energy or power in the generator. The generator may typically be arranged inside the nacelle.

The wind turbine rotor may be coupled directly to the generator rotor in so-called direct drive wind turbines. Or the wind turbine rotor may include a main rotor shaft (a so-called "low speed shaft") which leads to a gearbox. A high-speed shaft of the gearbox may then drive the generator. Regardless of the topology of the wind turbine, the electrical power output of the generator may be fed to an electric grid. The connection of the generator to the grid may include e.g. a converter, transformer, medium voltage line and other.

Elements like the gearbox, the generator, and converter, electrical power cables, cooling systems and structures (e.g. bedplate and frames) may be partly or completely housed in a nacelle. The nacelle provides a cover to protect such elements from the outside environment. The nacelle may comprise a structural frame made of e.g. steel beams and bars and a housing or enclosure made of a composite material such as glass fibre reinforced composites.

Throughout the lifetime of a wind turbine, it may be necessary to remove a component such as e.g. a gearbox from the nacelle for major repair or for substitution by a new component. It is known in the art to remove the roof the nacelle and lower the roof using a large crane. Access is thus provided to the nacelle from the top. The component that is to be removed or replaced can then be lifted out of the nacelle.

Using a large crane mounted on the ground can be expensive and cumbersome. The present disclosure provides methods and systems that avoid the use of such a large crane.

SUMMARY

In a first aspect, a wind turbine nacelle is provided which comprises a housing. The housing includes a front side, and a rear side separated from the front side along an axial direction, first and second sidewalls extending from the front side to the rear side and a roof. The roof comprises one or more roof panels, and at least one of the roof panels is a displaceable roof panel configured to be displaced along the axial direction with respect to another part of the roof to provide access to the nacelle from above.

In accordance with this aspect, a wind turbine nacelle is provided to which access can be provided from above the nacelle without the need for a ground mounted crane. A nacelle mounted crane may be erected or unfolded thanks to space created by removing the roof panel.

In a further aspect, a method for providing access to an inside of a wind turbine nacelle is provided. The method comprises detaching a displaceable roof panel from other portions of a roof of the nacelle and lifting the displaceable roof panel from an inside of the nacelle. The method further comprises displacing the displaceable roof panel towards a front or a rear of the nacelle.

In yet a further aspect, a nacelle for a wind turbine is provided. The nacelle comprises a housing including a including a front side, and a rear side separated from the front side along an axial direction, a roof, a first sidewall, and a second sidewall. The roof comprises a plurality of roof panels, and wherein one or more of the roof panels are displaceable roof panels configured to be detached from neighbouring roof panels and from the first and second sidewalls, and the nacelle is further configured to guide the displaceable roof panels in the axial direction.

BRIEF DESCRIPTION OF THE DRAWINGS

Non-limiting examples of the present disclosure will be described in the following, with reference to the appended drawings, in which.

DETAILED DESCRIPTION OF EXAMPLES

Reference now will be made in detail to embodiments of the disclosure, one or more examples of which are illustrated in the drawings. Each example is provided by way of explanation only, not as a limitation. In fact, it will be apparent to those skilled in the art that various modifications and variations can be made in the present disclosure without departing from the scope or spirit. For instance, features illustrated or described as part of one embodiment can be used with another embodiment to yield a still further embodiment. Thus, it is intended that the present disclosure covers such modifications and variations as come within the scope of the appended claims and their equivalents.

Figure 1:
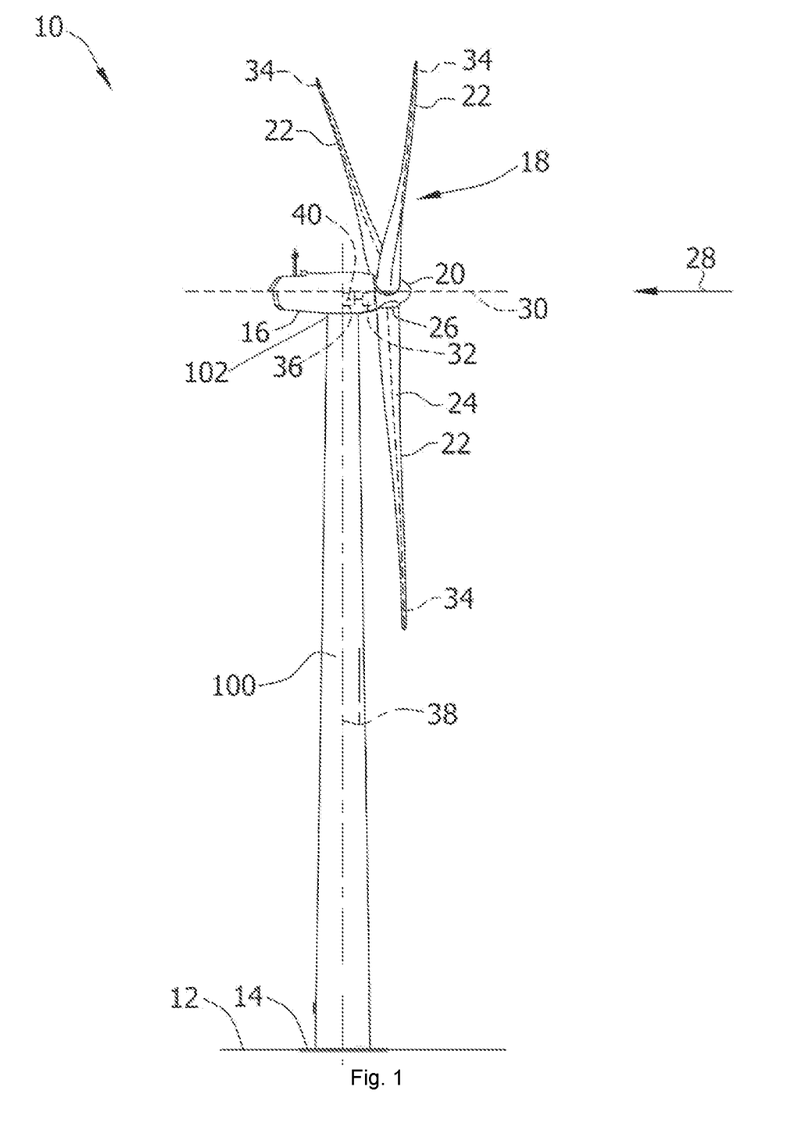
FIG. 1 illustrates a perspective view of a wind turbine according to one example.

FIG. 1 is a perspective view of an example of a wind turbine 10. In the example, the wind turbine 10 is a horizontal-axis wind turbine. Alternatively, the wind turbine 10 may be a vertical-axis wind turbine. In the example, the wind turbine 10 includes a tower 100 that extends from a support system 14 on a ground 12, a nacelle 16 mounted on tower 100, and a rotor 18 that is coupled to nacelle 16. The rotor 18 includes a rotatable hub 20 and at least one rotor blade 22 coupled to and extending outward from the hub 20. In the example, the rotor 18 has three rotor blades 22. In an alternative embodiment, the rotor 18 includes more or less than three rotor blades 22. The tower 100 may be fabricated from tubular steel to define a cavity (not shown in FIG. 1) between a support system 14 and the nacelle 16. In an alternative embodiment, the tower 100 is any suitable type of a tower having any suitable height. According to an alternative, the tower can be a hybrid tower comprising a portion made of concrete and a tubular steel portion. Also, the tower can be a partial or full lattice tower.

The rotor blades 22 are spaced about the hub 20 to facilitate rotating the rotor 18 to enable kinetic energy to be transferred from the wind into usable mechanical energy, and subsequently, electrical energy. The rotor blades 22 are mated to the hub 20 by coupling a blade root portion 24 to the hub 20 at a plurality of load transfer regions 26. The load transfer regions 26 may have a hub load transfer region and a blade load transfer region (both not shown in FIG. 1). Loads induced to the rotor blades 22 are transferred to the hub 20 via the load transfer regions 26.

In examples, the rotor blades 22 may have a length ranging from about 15 meters (m) to about 90 m or more. Rotor blades 22 may have any suitable length that enables the wind turbine 10 to function as described herein. For example, non-limiting examples of blade lengths include 20 m or less, 37 m, 48.7 m, 50.2 m, 52.2 m or a length that is greater than 91 m. As wind strikes the rotor blades 22 from a wind direction 28, the rotor 18 is rotated about a rotor axis 30. As the rotor blades 22 are rotated and subjected to centrifugal forces, the rotor blades 22 are also subjected to various forces and moments. As such, the rotor blades 22 may deflect and/or rotate from a neutral, or non-deflected, position to a deflected position.

Moreover, a pitch angle of the rotor blades 22, i.e., an angle that determines an orientation of the rotor blades 22 with respect to the wind direction, may be changed by a pitch system 32 to control the load and power generated by the wind turbine 10 by adjusting an angular position of at least one rotor blade 22 relative to wind vectors. Pitch axes 34 of rotor blades 22 are shown. During operation of the wind turbine 10, the pitch system 32 may particularly change a pitch angle of the rotor blades 22 such that the angle of attack of (portions of) the rotor blades are reduced, which facilitates reducing a rotational speed and/or facilitates a stall of the rotor 18.

In the example, a blade pitch of each rotor blade 22 is controlled individually by a wind turbine controller 36 or by a pitch control system 80. Alternatively, the blade pitch for all rotor blades 22 may be controlled simultaneously by said control systems.

Further, in the example, as the wind direction 28 changes, a yaw direction of the nacelle 16 may be rotated about a yaw axis 38 to position the rotor blades 22 with respect to wind direction 28.

In the example, the wind turbine controller 36 is shown as being centralized within the nacelle 16, however, the wind turbine controller 36 may be a distributed system throughout the wind turbine 10, on the support system 14, within a wind farm, and/or at a remote control center. The wind turbine controller 36 includes a processor 40 configured to perform the methods and/or steps described herein. Further, many of the other components described herein include a processor.

As used herein, the term "processor" is not limited to integrated circuits referred to in the art as a computer, but broadly refers to a controller, a microcontroller, a microcomputer, a programmable logic controller (PLC), an application specific, integrated circuit, and other programmable circuits, and these terms are used interchangeably herein. It should be understood that a processor and/or a control system can also include memory, input channels, and/or output channels.

Figure 2:
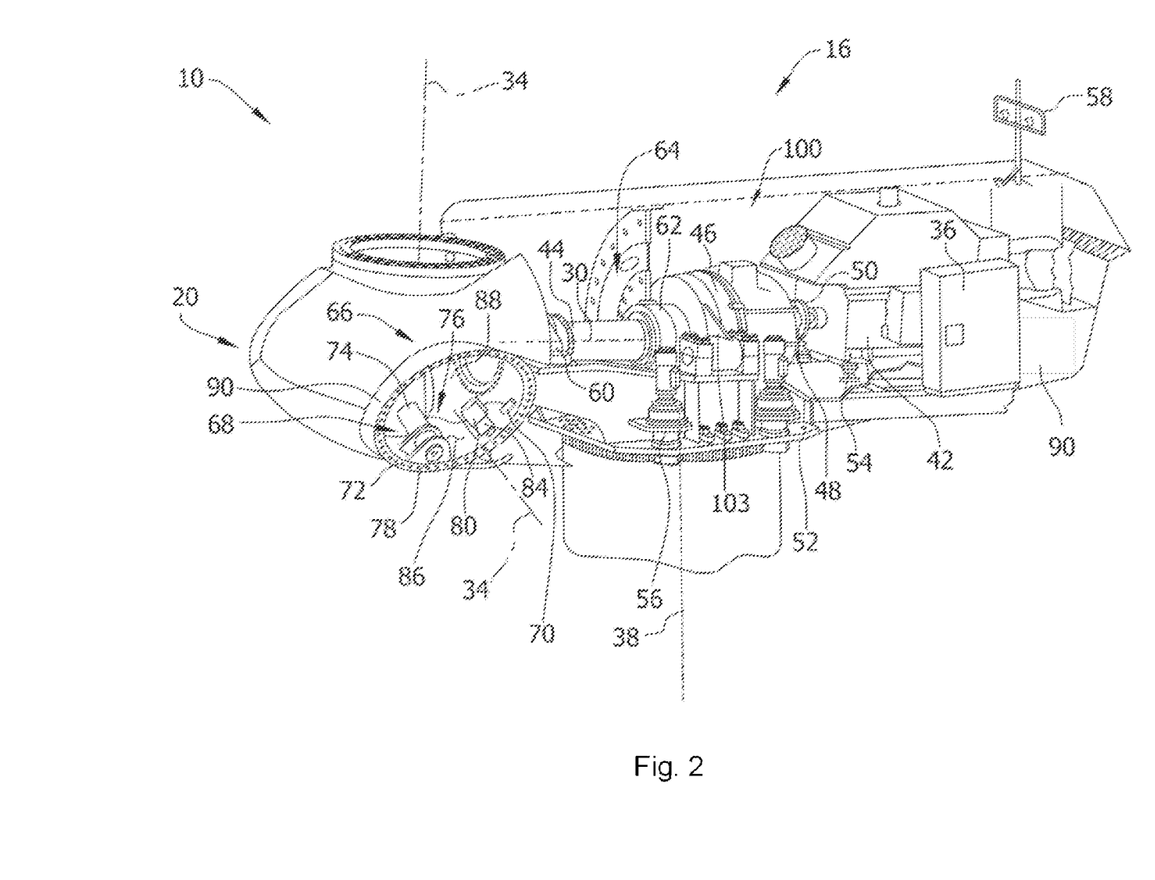
FIG. 2 illustrates a detailed, internal view of a nacelle of a wind turbine according to one example.

FIG. 2 is an enlarged sectional view of a portion of the wind turbine 10. In the example, the wind turbine 10 includes the nacelle 16 and the rotor 18 that is rotatably coupled to the nacelle 16. More specifically, the hub 20 of the rotor 18 is rotatably coupled to an electric generator 42 positioned within the nacelle 16 by the main shaft 44, a gearbox 46, a high-speed shaft 48, and a coupling 50. In the example, the main shaft 44 is disposed at least partially coaxial to a longitudinal axis (not shown) of the nacelle 16. A rotation of the main shaft 44 drives the gearbox 46 that subsequently drives the high-speed shaft 48 by translating the relatively slow rotational movement of the rotor 18 and of the main shaft 44 into a relatively fast rotational movement of the high-speed shaft 48. The latter is connected to the generator 42 for generating electrical energy with the help of a coupling 50. Furthermore, a transformer 90 and/or suitable electronics, switches, and/or inverters may be arranged in the nacelle 16 in order to transform electrical energy generated by the generator 42 having a voltage between 400V to 1000 V into electrical energy having medium voltage (10-35 KV) or higher voltage, e.g. 66 kV. Said electrical energy is conducted via power cables 160 from the nacelle 16 into the tower 100.

The gearbox 46, generator 42 in transformer 90 may be supported by a main support structure frame of the nacelle 16, optionally embodied as a main frame 52. The gearbox 46 may include a gearbox housing that is connected to the main frame 52 by one or more torque arms 103. In the example, the nacelle 16 also includes a main forward support bearing 60 and a main aft support bearing 62. Furthermore, the generator 42 can be mounted to the main frame 52 by decoupling support means 54, in particular in order to prevent vibrations of the generator 42 to be introduced into the main frame 52 and thereby causing a noise emission source.

Optionally, the main frame 52 is configured to carry the entire load caused by the weight of the rotor 18 and components of the nacelle 16 and by the wind and rotational loads, and furthermore, to introduce these loads into the tower 100 of the wind turbine 10. The rotor shaft 44, generator 42, gearbox 46, high speed shaft 48, coupling 50, and any associated fastening, support, and/or securing device including, but not limited to, support 52, and forward support bearing 60 and aft support bearing 62, are sometimes referred to as a drive train 64.

The nacelle 16 also may include a yaw drive mechanism 56 that may be used to rotate the nacelle 16 and thereby also the rotor 18 about the yaw axis 38 to control the perspective of the rotor blades 22 with respect to the wind direction 28.

For positioning the nacelle 16 appropriately with respect to the wind direction 28, the nacelle 16 may also include at least one meteorological measurement system which may include a wind vane and anemometer. The meteorological measurement system 58 can provide information to the wind turbine controller 36 that may include wind direction 28 and/or wind speed. In the example, the pitch system 32 is at least partially arranged as a pitch assembly 66 in the hub 20. The pitch assembly 66 includes one or more pitch drive systems 68 and at least one sensor 70. Each pitch drive system 68 is coupled to a respective rotor blade 22 (shown in FIG. 1) for modulating the pitch angel of a rotor blade 22 along the pitch axis 34. Only one of three pitch drive systems 68 is shown in FIG. 2.

In the example, the pitch assembly 66 includes at least one pitch bearing 72 coupled to hub 20 and to a respective rotor blade 22 (shown in FIG. 1) for rotating the respective rotor blade 22 about the pitch axis 34. The pitch drive system 68 includes a pitch drive motor 74, a pitch drive gearbox 76, and a pitch drive pinion 78. The pitch drive motor 74 is coupled to the pitch drive gearbox 76 such that the pitch drive motor 74 imparts mechanical force to the pitch drive gearbox 76. The pitch drive gearbox 76 is coupled to the pitch drive pinion 78 such that the pitch drive pinion 78 is rotated by the pitch drive gearbox 76. The pitch bearing 72 is coupled to pitch drive pinion 78 such that the rotation of the pitch drive pinion 78 causes a rotation of the pitch bearing 72.

Pitch drive system 68 is coupled to the wind turbine controller 36 for adjusting the pitch angle of a rotor blade 22 upon receipt of one or more signals from the wind turbine controller 36. In the example, the pitch drive motor 74 is any suitable motor driven by electrical power and/or a hydraulic system that enables pitch assembly 66 to function as described herein. Alternatively, the pitch assembly 66 may include any suitable structure, configuration, arrangement, and/or components such as, but not limited to, hydraulic cylinders, springs, and/or servomechanisms. In certain embodiments, the pitch drive motor 74 is driven by energy extracted from a rotational inertia of hub 20 and/or a stored energy source (not shown) that supplies energy to components of the wind turbine 10.

The pitch assembly 66 may also include one or more pitch control systems 80 for controlling the pitch drive system 68 according to control signals from the wind turbine controller 36, in case of specific prioritized situations and/or during rotor 18 overspeed. In the example, the pitch assembly 66 includes at least one pitch control system 80 communicatively coupled to a respective pitch drive system 68 for controlling pitch drive system 68 independently from the wind turbine controller 36. In the example, the pitch control system 80 is coupled to the pitch drive system 68 and to a sensor 70. During normal operation of the wind turbine 10, the wind turbine controller 36 may control the pitch drive system 68 to adjust a pitch angle of rotor blades 22.

According to an embodiment, a power supply 84, for example comprising a battery, electric capacitors hence letter or an electrical generator driven by the rotation of the hub 20, is arranged at or within the hub 20 and is coupled to the sensor 70, the pitch control system 80, and to the pitch drive system 68 to provide a source of power to these components. In the example, the power supply 84 provides a continuing source of power to the pitch assembly 66 during operation of the wind turbine 10. In an alternative embodiment, power supply 84 provides power to the pitch assembly 66 only during an electrical power loss event of the wind turbine 10. The electrical power loss event may include power grid loss or dip, malfunctioning of an electrical system of the wind turbine 10, and/or failure of the wind turbine controller 36. During the electrical power loss event, the power supply 84 operates to provide electrical power to the pitch assembly 66 such that pitch assembly 66 can operate during the electrical power loss event.

In the example, the pitch drive system 68, the sensor 70, the pitch control system 80, cables, and the power supply 84 are each positioned in a cavity 86 defined by an inner surface 88 of hub 20. In an alternative embodiment, said components are positioned with respect to an outer surface of hub 20 and may be coupled, directly or indirectly, to outer surface.

Figure 3:
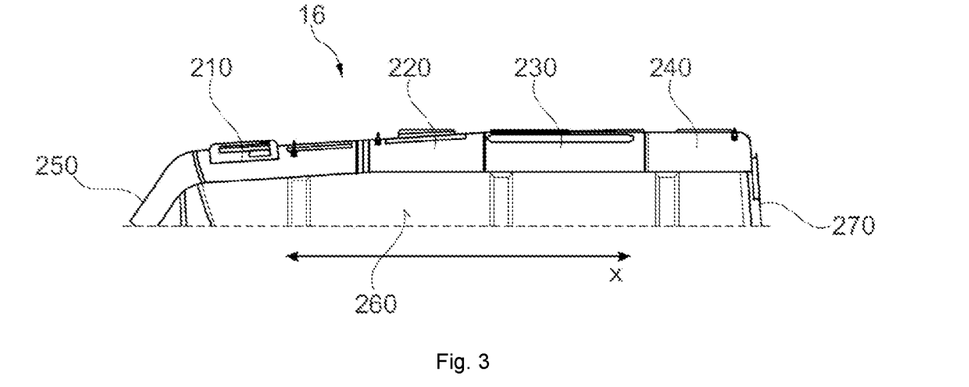
FIG. 3 schematically illustrates an example of a top part of a wind turbine nacelle.

FIG. 3 schematically illustrates an example of a wind turbine nacelle. In FIG. 3, only an upper part of a housing of the nacelle is shown. The housing may be made up of a plurality of panels, which may be made of e.g. a fibre reinforced composite. Inside the housing, a (steel) structural frame may be provided. The frame may be attached to the housing such that the loads on the housing can be transmitted to the frame and to the wind turbine tower.

In a first aspect of the present disclosure, a wind turbine nacelle 16 is provided. The nacelle 16 comprises a housing including a front side 270, and a rear side 250 separated from the front side along an axial direction x. The housing further comprises a first sidewall 260 and a second sidewall (not visible in this side view) extending from the front side 270 to the rear side 250. The housing also comprises a roof. The roof comprises one or more roof panels 210, 220, 230, 240, and at least one of the roof panels 210, 220, 230, 240 is a displaceable roof panel configured to be displaced along the axial direction x to provide access to the nacelle 16 from above. The displaceable roof panel can be displaced with respect to a part of the nacelle, i.e. not the whole nacelle roof is displaced.

The front side 270 may be defined by the position of the wind turbine rotor upstream from the nacelle. The front side 270 of the nacelle may generally be the upstream side of the nacelle. The rear side 250 of the nacelle may generally be the downstream side of the nacelle.

One or more of the roof panels 210, 220, 230, 240 may be displaceable along the x-direction. The roof panels may have different lengths. In examples, the length of the roof panels may be between 1 and 3 meters, and more particularly between 1.2 and 2.5 meters. In this particular example, four roof panels are shown, but it should be clear that in other examples, a different number of roof panels may be used, specifically between 2 and 8 panels.

In examples, the displaceable roof panel(s) may be configured to be displaced rearwards. Generally, there may be more available space at a downstream side of the nacelle, where the wind turbine rotor is not arranged.

Figure 4A:
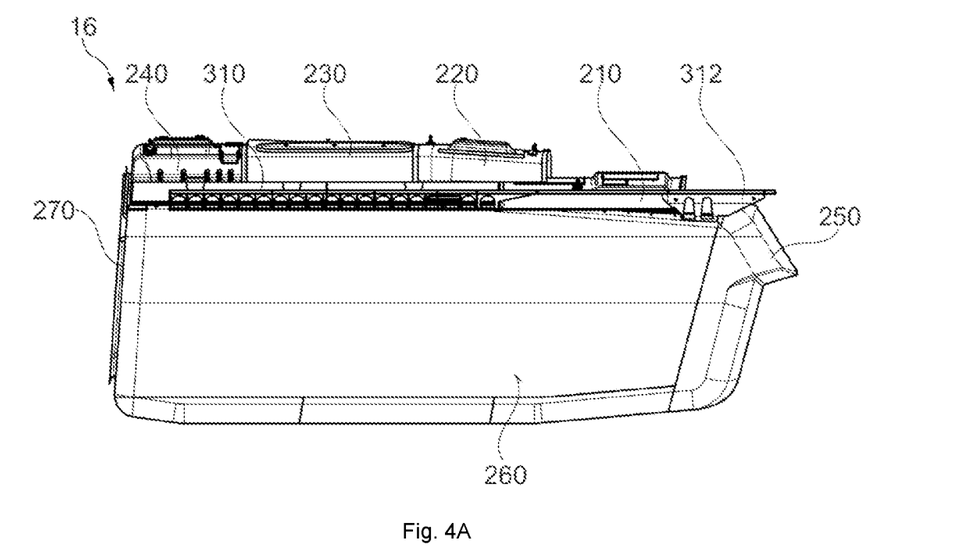
FIGS. 4A and 4B schematically illustrate an example of a wind turbine nacelle with displaceable roof panels and components thereof.

FIG. 4A schematically illustrates an example in which a plurality of roof panels is displaceable. In the illustrated example, three roof panels 240, 230, 220 may be displaced rearwardly.

As will be illustrated in further detail, the first sidewall 260 and the second sidewall comprise first and second guiding elements 310. And the displaceable roof panels 240, 230, 220 comprise a first and second guided elements (on the first and second sidewall respectively) configured to be guided by the first and second guiding elements 310 respectively.

Figure 4B:
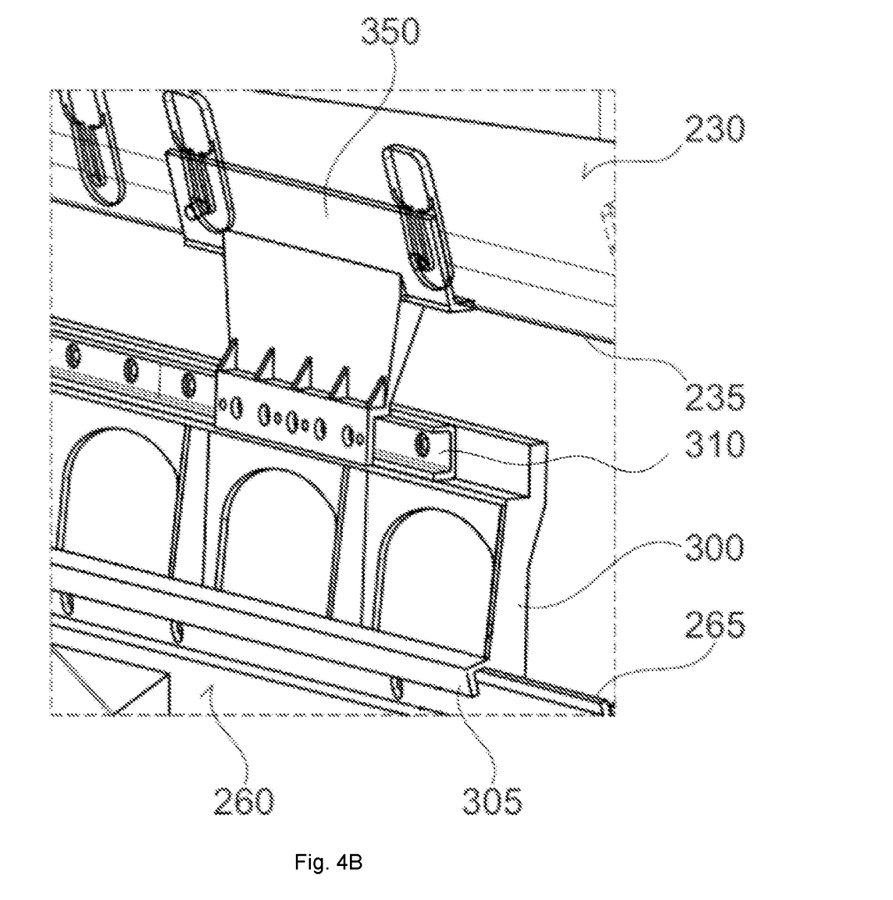

An example of the guided and guiding elements is shown in FIG. 4B. The first sidewall 260 comprises a first side bracket 300 carrying one of the guiding elements 310, and the second sidewall comprises a second side bracket carrying another one of the guiding elements (not shown). The displaceable roof panel 230 comprises a roof bracket 350, wherein the guided element 360 is arranged at or near a lower end of the roof bracket 350.

In this example, the first and second guiding elements 310 are rails. And the guided element may be sliders 360 (visible in FIG. 5C) configured to be received in the rails. The sliders 360 may be slid along the rails to displace the roof panel along the axial direction. Sliders may herein be regarded as components which allow a gliding, or sliding or even rolling of the roof (bracket) with respect to the sidewall (bracket). The sliders may include wheels, pads, friction reducing elements etc. as appropriate.

As may be seen in FIG. 4B, the side brackets may be mounted at a top of the side panel i.e. at a junction between the side panel and roof panel. The side bracket 300 may comprise a substantially U-shaped flange 305 to receive a top edge 265 of a sidewall. The roof bracket 350 may comprise a similarly U-shaped flange to receive a lower edge 235 of the roof panel.

Further shown in this particular example of FIG. 4 is a rear bracket 312. The rear bracket 312 incorporates a part of a guiding element that forms a continuation of the guiding element of the sidewall brackets, i.e. rail 310.

The rear bracket 312 in this particular example may be attached to a sidewall of the housing of the nacelle. The most rearward panel 210 may have been displaced forwards in order to create space for the mounting of the rear bracket.

The rear bracket 312 may be attached at an outside of the housing, either on the roof or on a sidewall of the nacelle housing. In other examples, such a rear bracket 312 may not be used.

In a further aspect of the present disclosure, a method for providing access to an inside of a wind turbine nacelle 16 is provided. The method comprises detaching a displaceable roof panel from other portions of a roof of the nacelle 16 and lifting the displaceable roof panel from an inside of the nacelle. The method them further comprises displacing the displaceable roof panel towards a front 250 or a rear 270 of the nacelle. Particularly, the displaceable roof panel may be displaced over other portions of the nacelle, e.g. other roof panels.

At least the panels that are configured to be detached from neighbouring portions of the nacelle may be removably mounted using e.g. a bolted connection. Lifting the displaceable roof panel(s) may comprise the use of a hydraulic lifting mechanism such as a hydraulic jack from an inside of the nacelle.

The displaceable roof panel may be detached from neighbouring portions of the roof, but also from neighbouring portions of other parts of the housing such as the sidewalls.

After lifting the roof panels, a first side bracket 300 may be mounted to a first sidewall 260 of the nacelle, and similarly a second side bracket may be mounted to a second sidewall of the nacelle. The first sidewall and second sidewall may correspond to the two sides (left and right) of the nacelle. A sidewall may be composed of a single sidewall panel, or of multiple sidewall panels. The first and second side brackets comprise guiding elements 310 to guide the displaceable roof panel.

As illustrated before, the first and second brackets may be mounted to a top 265 of the first and second sidewalls. Sufficient vertical space may herewith be created to displace a roof panel over a neighbouring roof panel which may stay in place.

The method may further comprise mounting a first and a second roof bracket 350 to the displaceable roof panel 230, the first and second roof brackets 350 comprising a slider 360 configured to be guided by the guiding elements 310 of the first and second side brackets 300.

In examples, displacing the displaceable roof panel may further comprise manually pushing the displaceable roof panel. I.e, an operator in the nacelle can simply push the displace roof panels in the axial direction. In other examples, pushing or pulling mechanism may be installed in the nacelle to replace or aid the manual pushing by the operator.

In examples, once one or more roof panels have been displaced, sufficient space may have been created for maintenance tasks which may involve erecting or unfolding a crane inside the nacelle. A crane mounted nacelle may be used to lift heavy components inside the nacelle, like a gearbox, generator or converter.

Figure 5A:
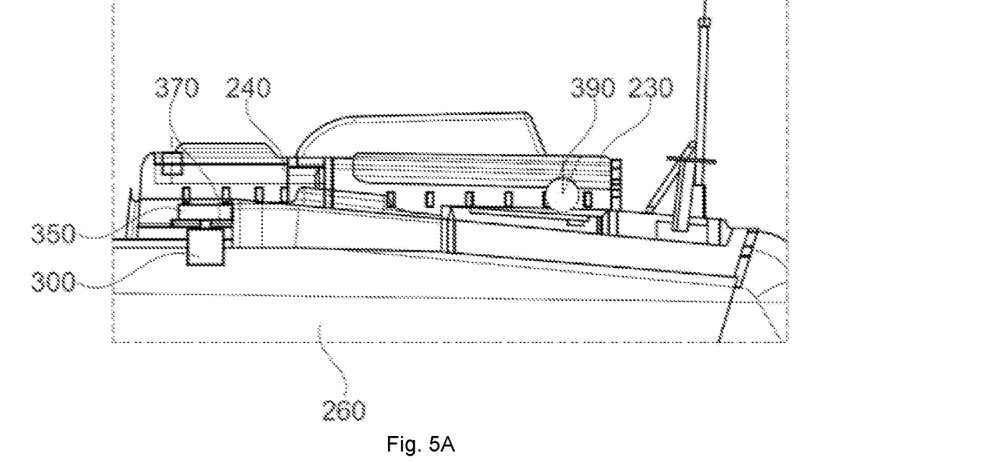
FIGS. 5A-5C schematically illustrate a further example of a wind turbine nacelle with displaceable roof panels.
Figure 5B:
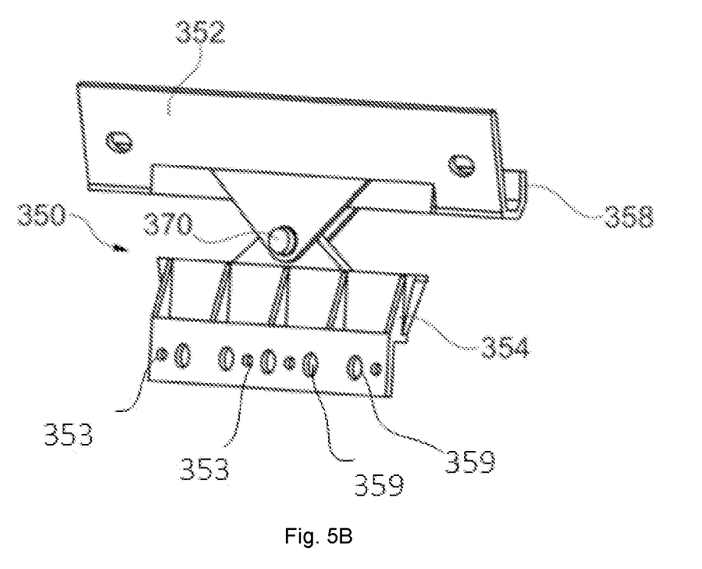
Figure 5C:
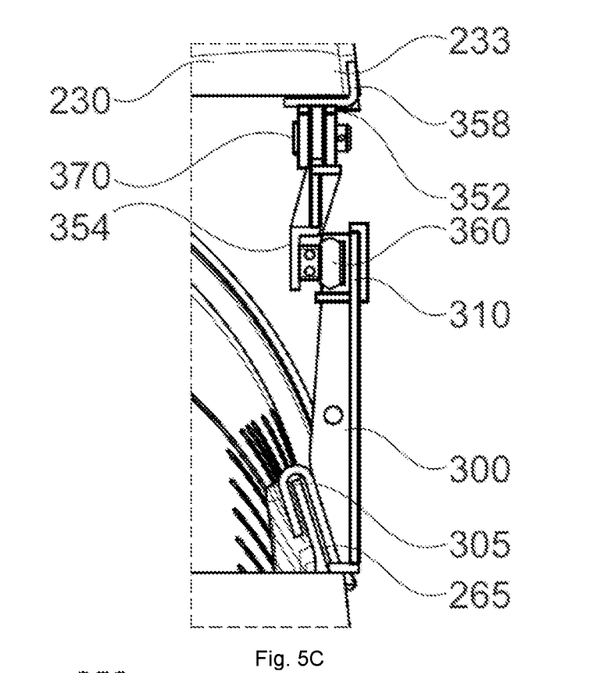

FIG. 5 schematically illustrates a further example of a nacelle with displaceable roof panels. According to an aspect of the present disclosure, a nacelle 16 for a wind turbine is provided, which comprises a housing including a including a front side, and a rear side separated from the front side along an axial direction, a roof, a first sidewall, and a second sidewall. The roof comprises a plurality of roof panels, and wherein one or more of the roof panels are displaceable roof panels 230, 240 configured to be detached from neighbouring roof panels and from the first and second sidewalls. The nacelle is further configured to guide the displaceable roof panels 230, 240 in the axial direction.

The example of FIG. 5 generally functions similarly as the example of FIG. 4. However, the example of FIG. 5 is different from the example of FIG. 4 in that the roof bracket comprises a hinge allowing tilting of an upper part of the roof bracket with respect to a lower part of the roof bracket. This is illustrated in more detail in in FIG. 5B.

The displaceable roof panels may comprise a first and second slider 360 as before, and the sliders may be arranged at or near a bottom of the roof brackets to mate with a guide or rails 310 of the side brackets.

The roof bracket 350 comprises an upper part 352 which comprises a U-shaped flange 358 to receive a bottom edge of a roof panel. The roof bracket 350 of this example further comprises a lower part 354. The upper part 358 is hingedly connected to the lower part 354 such that the upper part 358 can tilt with respect to the lower part.

In examples, the displaceable roof panels do not follow a linear (horizontal) path completely supported by rails. Rather, due to the shape of the nacelle, the path of the displaceable roof panels may have portions that are at an angle with neighbouring portions.

In examples, one of the displaceable rood panels comprises a first and second slider 360, and wherein the first sidewall comprise a first rail 310 to guide the first slider 360, and the second sidewall comprises a second rail to guide the second slider. The slider 360 may be configured to rotate with respect to the displaceable roof panel.

A hinge 370 between the upper and lower parts 358, 354 of the roof bracket allows the slider 360 to tilt or rotate with respect to the roof panel and adjust for differing inclinations along its path.

In examples, a limited amount of rotation of e.g. less than 25° in either direction is allowed, and specifically less than 20°. Stoppers may be provided to limit the amount of rotation in either direction.

The roof bracket 350 may further comprise mounting holes 353 for removably mounting slider 360. If the slider 360 needs to be replaced or repaired, it may easily be removed. Furthermore, in this example, roof bracket 350 comprises a possibility to adjust a preload on the sliders or e.g. the wheels of the sliders. Holes 359 provided in this example in the lower part 354 of roof bracket 350 at a height at which the slider 360 may be mounted. In the shown examples, bolts extending through holes 359 may be used to adjust a preload. Adjusting a preloading may be useful e.g. when a rail 310 or raceway is substituted or changed for another.

FIG. 5C further illustrates the attachment of side bracket 300 with rail 310 and a how a U-shaped flange 305 may receive a top edge 265 of a sidewall of the housing of the nacelle. FIG. 5C further illustrates the mounting of the roof bracket and the hinge 370 allowing tilting of the upper part 358 of the roof bracket with respect to a lower part 354 of the roof bracket.

A further difference between the example of FIG. 5 and the example of FIG. 4 is that a displaceable roof panel in the example of FIG. 5 may comprise an additional support at or near an end of the roof panel. In the example illustrated in FIG. 5A, the additional support may include one or more wheels which allow the displaceable roof panel to roll over neighbouring roof panels. I.e, the weight of the roof panel is supported in the rails and side brackets, but also by the additional support.

Figure 6:
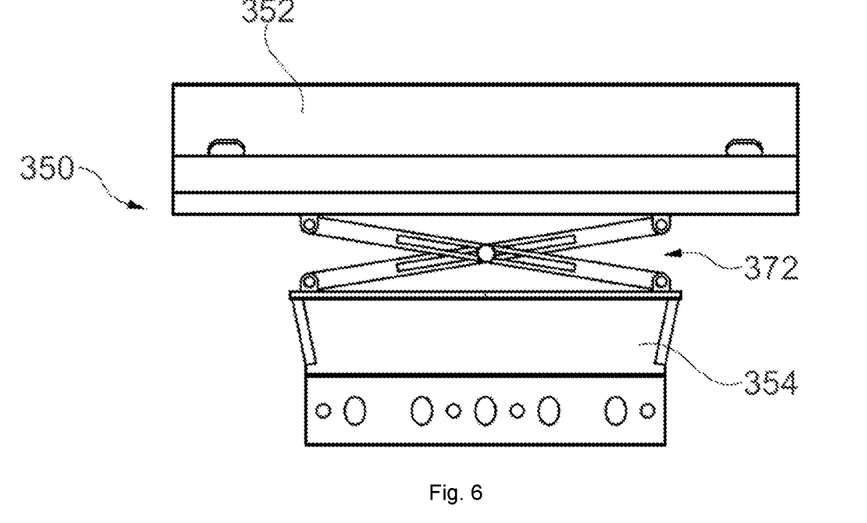
FIG. 6 schematically illustrates an alternative example of a mechanism for displacing roof panels.

FIG. 6 schematically illustrates an alternative example of a mechanism for displacing roof panels. FIG. 6 shows an alternative example of a roof bracket 350 which may be attached to a displaceable roof panel. The bottom part 354 of the roof bracket 350 may incorporate a guided element such as a slider. The upper part 352 of the roof bracket 350 may again be configured to be attached to the displaceable roof panel and to support the roof panel.

As in the example of FIG. 5, the upper part 352 of the roof bracket may tilt with respect to the lower part 354 of the roof bracket 350 or vice versa. An alternative hinge 372 is herein provided comprising a scissor like structure including legs that are connected at a central point. Each of the legs comprises a slot like structure along which the central connection point may be displaced to allow for tilting.

Figure 7:
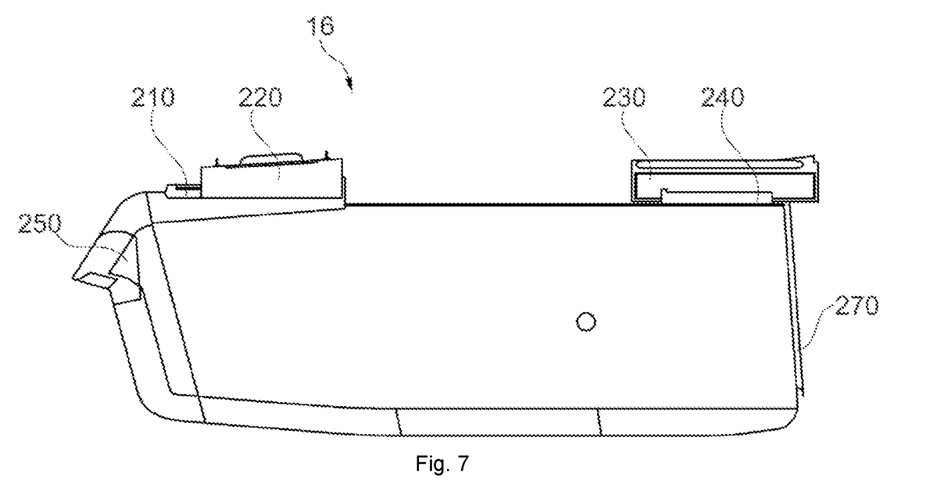
FIGS. 7-10 schematically illustrates further examples of wind turbine nacelles.

FIG. 7 schematically illustrates a further example of a nacelle. In FIGS. 4 and 5, examples have been shown in which multiple displaceable roof panels are displaced along the same axial direction. In examples, such as the ones illustrated in FIGS. 4 and 5, first and second displaceable roof panels may be displaced as a unit. I.e, between them they remain attached.

In the example of FIG. 7, a first displaceable roof panel 230 is configured to be displaced forwards, and the second displaceable roof panel 220 is configured to be displaced rearwards. In the illustrated example, roof panel 230 rests over a neighbouring front roof panel 240 in its most forward position, and roof panel 220 rests over a neighbouring rear roof panel 210 in its most rearward position.

In non-illustrated examples, first and second displaceable roof panels may be displaced in the same axial direction (particularly rearwards) but move independently from one another. The first displaceable roof panel may be placed over the second displaceable roof panel when both roof panels have been displaced to their rest positions e.g. their most rearward positions.

Figure 8:
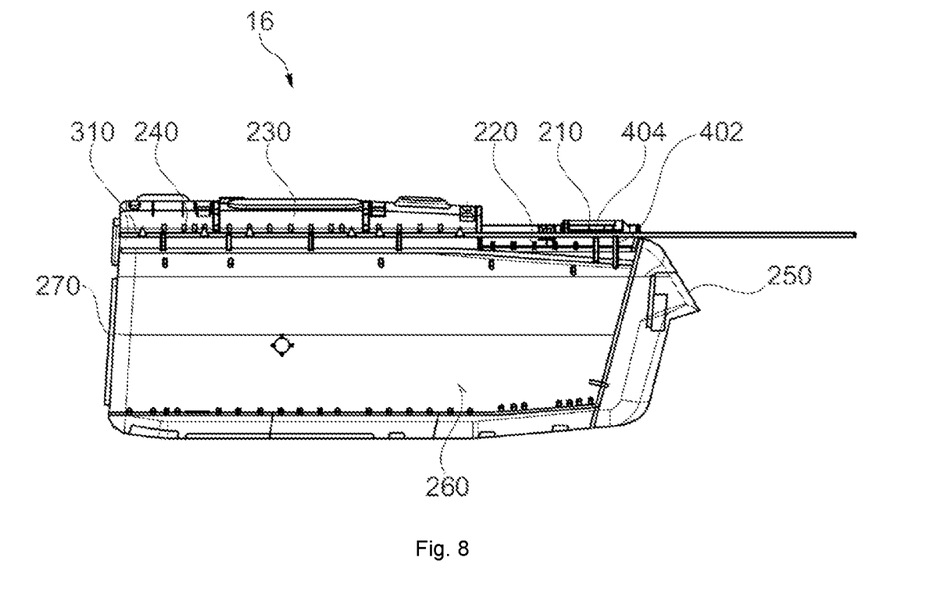

FIG. 8 schematically illustrates a further example of a wind turbine nacelle. The nacelle 16 once again includes sidewalls, of which a first sidewall 260 is visible this side view, a front or upstream side 270 and a rear or downstream side 250. The housing of the nacelle 16 further comprises a plurality of roof panels, 210, 220, 230 and 240. In this example, roof panels 220, 230, 240 are displaceable roof panels and they may be displaced along an axial direction, and more particularly they may be displaced rearwards.

In this example, displaceable roof panels 220, 230, 240 may be displaced as a unit, i.e. they remain attached to each other at all times. In order to displace them, the roof panels 220, 230, 240 may be detached from neighbouring portions of the nacelle and lifted. A rail may be attached to the nacelle, and particularly to the sidewalls of the nacelle housing. Roof brackets may be attached as herein before illustrated and these roof brackets may include sliders or alternatively rolling elements configured to be received in the rail.

The rail 310 in this example may be substantially completely linear and horizontal. The rail 310 may be supported through a plurality of side brackets attached to the sidewalls of the housing, particularly along portions of the sidewall where the roof panels have been lifted.

The rail may further be supported at supports 402, 404 on a rear portion of the nacelle. These supports may be attached at an outside of the nacelle, contrary to the side brackets arranged along the more forward parts of the nacelle.

In the illustrated example, as may be seen in the figure, the rail 310 extends beyond the rear end of the nacelle in a manner such that the roof panels 220, 230, 240 may be moved in a rearwards direction such that at least roof panel 220 reaches beyond a rear end of the nacelle. In the illustrated example, the roof panels 240, 230, 220 may be displaced rearwardly to an extent that the roof of the nacelle is open along the entire length of the panels 220, 230, 240.

Although in this particular example, a rail was mentioned as a guiding element, it should be clear that in other examples, other guiding elements might be used including e.g. bearings, raceways, bushings or other.

Figure 9:
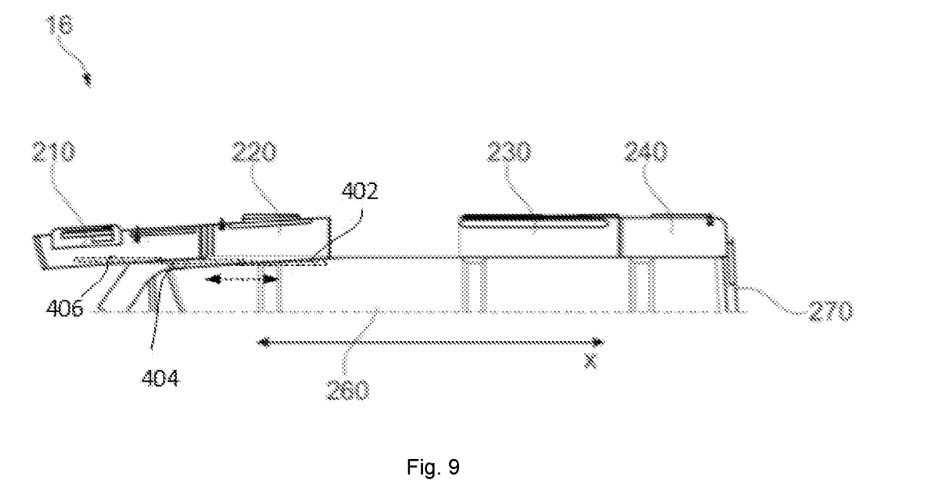

FIG. 9 schematically illustrates a wind turbine nacelle according to a further example. The nacelle 16 includes a telescopic mechanism. The telescopic mechanism may comprise a guiding element (e.g. a base rail 802) and a guided element, e.g. further rail portions 804, 806. One of the further rail portions 806 may be attached to a displaceable roof panel.

In normal operation, the telescopic mechanism may be partially of fully extended in a first direction (e.g. towards a front of the nacelle), and a base of the telescopic mechanism may be attached to a sidewall 260 of the housing of the nacelle. To provide access from above, the displaceable roof panel(s) 210 may be separated from other portions of the housing and the telescopic mechanism may be extended in an opposite direction (e.g. in a rearwards direction of the nacelle) to displace the displaceable roof panel along the axial direction.

Figure 10:
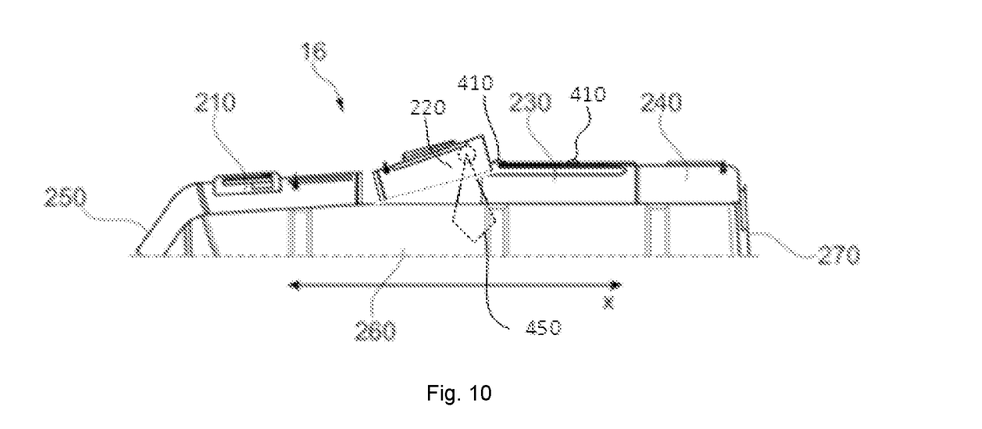

FIG. 10 illustrates yet a further example of a nacelle 16. The nacelle 16 in this example comprises roof panels 210, 220, 230, 240. The displaceable roof panel 220 can be lifted and displaced in an axial direction x. In this particular example, the displaceable roof panel 220 may be displaced in a forward direction.

The roof panel 230 which is neighbouring to displaceable roof panel 220 may comprise a plurality of rollers 410. The roof panel 230 may be lifted from an inside of the nacelle. A hydraulic jack like a hydraulic scissor jack 250 may be used. In examples, the hydraulic jack may include a roller or wheel. After lifting the displaceable roof panel 220, the roof panel may be pushed in the axial direction and further slide over rollers 420 incorporated in a neighbouring panel.

This written description uses examples to disclose the present teaching, including the preferred embodiments, and also to enable any person skilled in the art to practice the invention, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. Aspects from the various embodiments described, as well as other known equivalents for each such aspects, can be mixed and matched by one of ordinary skill in the art to construct additional embodiments and techniques in accordance with principles of this application. If reference signs related to drawings are placed in parentheses in a claim, they are solely for attempting to increase the intelligibility of the claim, and shall not be construed as limiting the scope of the claim.

The invention claimed is:

1. A wind turbine nacelle, comprising:
a housing including a front side, a rear side separated from the front side along an axial direction, first and second sidewalls extending from the front side to the rear side, and a roof;
the roof comprising a first roof panel aligned flush with adjacent portions of the roof; and
wherein the first roof panel is a displaceable roof panel configured to be lifted upwards from the first and second sidewalls and then displaced linearly along the axial direction above the other portions of the roof to provide access to the nacelle from above.

2. The wind turbine nacelle according to claim 1, wherein the displaceable roof panel is configured to be displaced rearwards towards the rear side.

3. The wind turbine nacelle according to claim 1, wherein the first and second sidewalls comprise first and second guiding elements, and wherein the displaceable roof panel comprises first and second guided elements configured to be guided by the first and second guiding elements, respectively.

4. The wind turbine nacelle according to claim 3, wherein the first sidewall comprises a first side bracket carrying the first guiding element, and the second sidewall comprises a second side bracket carrying the second guiding element, the displaceable roof panel comprising a roof bracket, and the guided element arranged at a lower end of the roof bracket.

5. The wind turbine nacelle according to claim 3, wherein the first and second guiding elements are rails, and wherein the guided elements are sliders configured to be received in the rails.

6. The wind turbine nacelle according to claim 1, wherein the roof comprises a second displaceable roof panel configured to be lifted upwards from the first and second sidewalls and then displaced linearly along the axial direction.

7. The wind turbine nacelle according to claim 6, wherein the first and the second displaceable roof panels are configured to be displaced rearwards towards the rear side.

8. The wind turbine nacelle according to claim 7, wherein the first displaceable roof panel is placed over the second displaceable roof panel when both roof panels have been displaced to their most rearward positions.

9. The wind turbine nacelle according to claim 6, wherein the first displaceable roof panel is configured to be displaced forwards towards the front side, and the second displaceable roof panel is configured to be displaced rearwards towards the rear side.

10. A wind turbine, comprising the wind turbine nacelle according to claim 1.

11. A wind turbine nacelle, comprising:
a housing including a front side, a rear side separated from the front side along an axial direction, first and second sidewalls extending from the front side to the rear side, and a roof;
the roof comprising one or more roof panels;
wherein at least a first one of the roof panels is a displaceable roof panel configured to be displaced along the axial direction with respect to other portions of the roof to provide access to the nacelle from above;
wherein the first and second sidewalls comprise first and second guiding elements, and wherein the displaceable roof panel comprises first and second guided elements configured to be guided by the first and second guiding elements, respectively;
wherein the first sidewall comprises a first side bracket carrying the first guiding element, and the second sidewall comprises a second side bracket carrying the second guiding element, the displaceable roof panel comprising a roof bracket, and the guided element arranged at a lower end of the roof bracket; and
wherein the roof bracket comprises a hinge allowing tilting of an upper part of the roof bracket with respect to a lower part of the roof bracket.

12. A method for providing access to an inside of a wind turbine nacelle, the method comprising:
detaching a displaceable roof panel from other portions of a roof of the nacelle, wherein the displaceable roof panel is initially flush with the other portions of the roof;
lifting the displaceable roof panel linearly above the other portions of the roof towards a front or a rear of the nacelle; and
mounting a first side bracket to a first sidewall of the nacelle, and mounting a second side bracket to a second sidewall of the nacelle, wherein the first and second side brackets include elements to guide the displaceable roof panel.

13. The method of claim 12, wherein the first and second brackets are mounted to a top of the first and second sidewalls.

14. The method of claim 12, further comprising:
mounting a first and a second roof bracket to the displaceable roof panel, the first and second roof brackets comprising a slider configured to be guided by the guiding elements of the first and second side brackets.

15. The method of claim 12, wherein displacing the displaceable roof panel comprises manually pushing the displaceable roof panel.

16. The method of claim 12, further comprising erecting a crane inside the nacelle.

* * * * *